No. 683,444. Patented Oct. 1, 1901.
W. W. COWEN.
CIRCUIT CONTROLLER.
(Application filed Jan. 8, 1901.)
(No Model.)
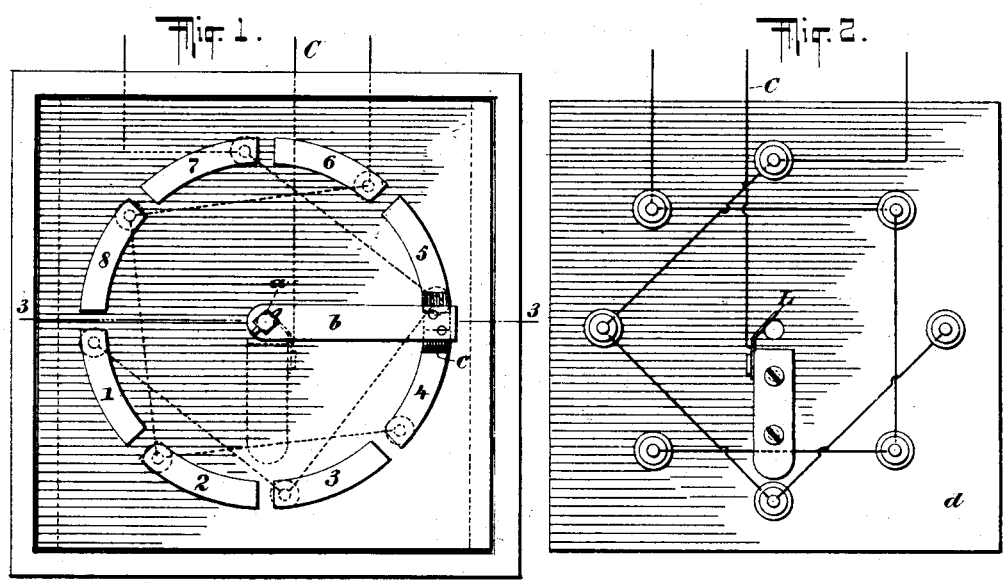
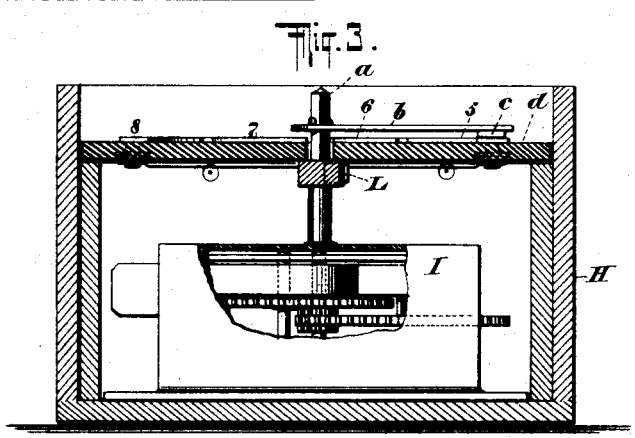
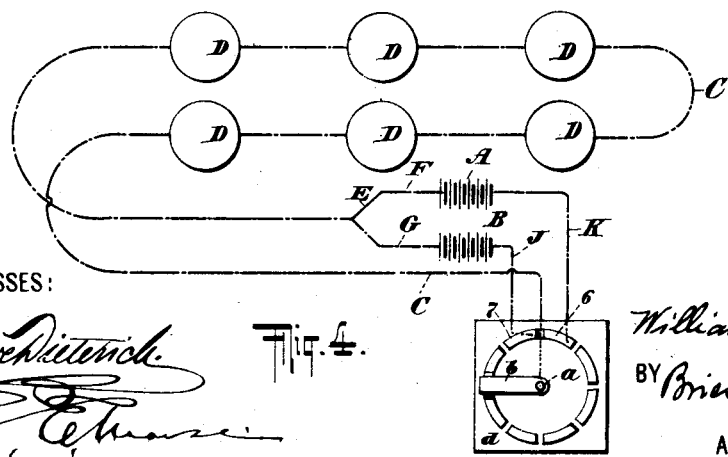
WITNESSES:
INVENTOR
William W. Cowen
BY Briesen & Knauth
ATTORNEYS

UNITED STATES PATENT OFFICE.

WILLIAM W. COWEN, OF NEW YORK, N. Y.

CIRCUIT-CONTROLLER.

SPECIFICATION forming part of Letters Patent No. 683,444, dated October 1, 1901.

Application filed January 8, 1901. Serial No. 42,496. (No model.)

*To all whom it may concern:*

Be it known that I, WILLIAM W. COWEN, a citizen of the United States, residing in the borough of Manhattan, city, county, and State of New York, have invented certain new and useful Improvements in Circuit-Controllers, of which the following is a specification.

My invention relates to circuit-controllers and electrical circuits embodying as one of their features a circuit-changer of the character described.

The invention is especially adapted for use in fire-alarm-telegraph systems wherein the apparatus operates on open circuit and it is necessary to maintain the circuit closed at all times.

The object of the invention is to economize batteries by including them in the circuit for such short periods of time that they do not get time to become polarized.

It is of course well known that batteries now in common use polarize rapidly and become useless until depolarized, and many means have been devised to depolarize the batteries and even to prevent or retard polarization. By my invention these difficulties are in the main obviated and the batteries work at full strength until exhausted.

My invention will be described with the aid of the accompanying drawings and the essential features of the invention pointed out in the claim at the end of this specification.

In the drawings, Figure 1 is a plan view of the circuit-controller in which my invention is embodied. Fig. 2 is an underneath view of the cover thereof. Fig. 3 is a section on the line 3 3 of Fig. 1, and Fig. 4 is a diagrammatic view of the battery-circuits.

In the drawings, A and B represent two batteries preferably of equal strength or capacity. These batteries are shown as connected in a signaling system consisting of an outside circuit C and fire-alarm signaling-boxes D. One end of the circuit-wire is connected to the spindle $a$ of the circuit-controller, as will be explained, and the other circuit-wire branches at E into two wires F and G, connected, respectively, to the batteries A and B. The circuit-controller comprises in the present instance a box H, containing a clockwork or other motor I, having the spindle $a$, to which is connected the arm $b$, provided with a brush or contact-maker $c$. The top plate or cover $d$ is provided with a series of contact-plates 1 2 3 4 5 6 7 8. A greater or less number may be used. These contact-plates are connected in circuit as follows: Contact-plates 1, 3, 5, and 7 are connected together and to the wire J, which is connected to the battery B, and the contact-plates 2, 4, 6, and 8 are connected together and to the wire K, which is connected to the battery A. The exterior circuit-wire C is connected to a spring L, which is in rubbing contact with the rotating spindle $a$ of the circuit-controller.

The operation of the device will be obvious. The rapidly-rotating arm $b$ will alternately connect battery A and battery B into circuit for short periods of time, so that each battery is used alternately for short periods of time, so that each battery will have time to recover or become depolarized. It will be observed that the brush or contact-maker $c$ is preferably wide enough to bridge the space between any two contact-plates, so that the battery is never at any instant entirely off the line—that is to say, the line is never open at the circuit-controller.

Having described my invention, what I claim, and desire to secure by Letters Patent, is—

In a circuit-controller, the combination of a series of circularly-disposed contact-plates connected in alternation to different batteries, an arm L to which the common wire of the batteries is connected, an arbor upon which the said arm maintains a rubbing contact, and a contact-arm carried by said arbor and having a contact-brush adapted to bridge over the interval between two contact-plates.

WILLIAM W. COWEN.

Witnesses:
 GEO. E. MORSE,
 OTTO V. SCHRENK.